:::::
United States Patent Office 3,472,828
Patented Oct. 14, 1969

3,472,828
PROCESS FOR PREPARING FLUID CHLOROPRENE POLYMERS IN THE PRESENCE OF DIALKYL XANTHOGEN DISULFIDES
Franklin Luckenbill Montgomery, Wilmington, Del., assignor to E. I. du Pont de Nemours and Company, Wilmington, Del., a corporation of Delaware
No Drawing. Filed June 16, 1967, Ser. No. 646,494
Int. Cl. C08d 1/32, 3/14
U.S. Cl. 260—92.3
3 Claims

ABSTRACT OF THE DISCLOSURE

The present invention is directed to a noval process for preparing chloroprene polymers and copolymers wherein the monomer or monomers are polymerized in aqueous emulsion in the presence of a specified amount of dialkyl xanthogen disulfide modifier, the improvement comprising the initiation of said polymerization in the presence of 25 to 45 percent by weight of total monomer and 50 to 100 percent of total modifier, followed by adding incrementally or continuously the balance of said monomer and modifiers.

BACKGROUND INFORMATION

It is known that chloroprene polymers of low molecular weight may be prepared by polymerizing chloroprene in the presence of relatively large amounts of a dialkyl xanthogen disulfide modifying agent. Such processes are taught in U.S. Patent 3,190,865 and British patent specification 905,971. This invention is an improvement on the processes of these references whereby, for a given amount of dialkyl xanthogen disulfide used in the polymerization system, polymers of significantly lower viscosity may be obtained.

DESCRIPTION OF THE INVENTION

The present invention is directed to a process for the preparation of chloroprene polymer or copolymers by polymerizing the monomer (or monomers) in aqueous emulsion in the presence of an amount of a dialkyl xanthogen disulfide modifier equivalent to 4 to 15 parts by weight of diethyl xanthogen disulfide, per 100 parts of monomer, in which process the improvement comprises initiating polymerization in the presence of, by weight, 25 to 45 percent of the total monomers to be polymerized and 50 to 100 percent of the total modifier to be used, and thereafter adding, incrementally or continuously, the remainder of the monomer and modifiers; the use of a sulfur component is optional.

In carrying out the process of this invention, chloroprene may be polymerized alone, or up to 50 percent by weight of the chloroprene may be replaced with another copolymerizable monomer. For a discussion of representative copolymerizable monomers which may be utilized see lines 52–69 of British patent specification 905,971. Optionally, sulfur may be present in the polymerization system by having about 0.2 to about 0.6 part of sulfur present in the polymerization emulsion; this embodiment results in polymers whose vulcanizates have superior retention of tensile properties on aging.

The dialkyl xanthogen disulfides that may be used in practicing this invention have the general formula

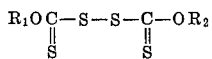

in which $R_1$ and $R_2$ are alkyl groups containing one to eight carbon atoms. Examples of suitable compounds are dimethyl xanthogen disulfide, diethyl xanthogen disulfide, diisopropyl xanthogen disulfide, the dibutyl xanthogen disulfides, and bis(2-ethylhexyl) xanthogen disulfide. The preferred compounds are those in which each alkyl group has one to four carbon atoms.

Four parts of diethyl xanthogen disulfide per 100 parts of monomers is the minimum amount that may be used to produce polymers of the desired fluidity. The improvement in polymer fluidity by using more than about 15 parts of diethyl xanthogen disulfide is nearly insignificant and, accordingly, this modifier concentration represents a practical upper limit. The amount of the different dialkyl xanthogen disulfides will vary somewhat with molecular weight. Also, for an unknown reason, there are small differences in the modifying effectiveness among molecularly equivalent amounts of various dialkyl xanthogen disulfides. For this reason, the amount of dialkyl xanthogen disulfide has been defined in terms of the amount equivalent to diethyl xanthogen disulfide. To determine the equivalent amounts of other dialkyl xanthogen disulfides, one may, for example, plot the viscosities of polymers prepared in the presence of varying amounts of a particular xanthogen disulfide and compare the graph with that from a similar one prepared when diethyl xanthogen disulfide is used. In general, the desired amount will fall within the range of about 4 to about 15 parts by weight, with some allowances in the upper and lower limits of the range to allow for higher and lower molecular weights and for variations in effectiveness.

In carrying out the process of this invention, two emulsions are prepared containing the monomers and modifiers in proportions defined above. After polymerization is initiated in Emulsion A, Emulsion B is fed to the reaction vessel, incrementally or continuously. The rate of addition is not critical. Some benefit will be realized if Emulsion B is added in two or more increments during the polymerization. The preferred method is to add Emulsion B at such a rate that the total monomer conversion (as indicated, for instance, by specific gravity) increases approximately steadily throughout the polymerization.

The critical feature of the invention process is that at least half of the modifying agent should be present in the initial emulsion containing only 25–45 percent of the monomer in order to produce polymers having significantly lower viscosities as compared with processes in which the ratio of modifier to monomer is maintained constant during the incremental addition or in which the predominant amount of modifier is added incrementally during the polymerization.

In using a mixture of chloroprene with another copolymerizable monomer, it may be desirable to have a major amount of the less readily polymerizable monomer present in Emulsion A.

For the polymerization the equeous emulsion may be prepared with any of the conventional emulsifying agents used in chloroprene polymerization. See page 1, lines 79–88 of British patent specification 905,971 for a discussion of these.

The pH of the emulsion should be between 5 and 11, preferably between 6 and 10. The optimum pH will depend somewhat on the emulsifying system being used, as will be apparent to those skilled in the art.

The conventional free-radical generating catalysts for chloroprene polymerizations may be used. These include organic and inorganic peroxy compounds, such as the water soluble persulfates, hydrogen peroxide and organic hydroperoxides and peroxides, such as cumene hydroperoxide ($\alpha$, $\alpha$-dimethylbenzyl hydroperoxide) and dibenzoyl peroxide. Rate of polymerization may be improved by the presence of suitable reducing agents, such as those disclosed in U.S. Patent No. 3,190,865.

The polymerization may be carried out between 0° and 80° C. The preferred temperature is between 20 and 55° C.

The concentration of organic monomer present in the aqueous emulsion is not critical. In general, 30 to 60 percent, by weight based on the total weight of the emulsion is the range of concentrations of organic monomer used in the preparation of polymer. The percent of monomer converted to polymer is not critical, but is usually between 50 and 100, preferably between 70 to 100 percent.

Preparation of emulsions and polymerization are carried out in an inert atmosphere, usually in an atmosphere of nitrogen.

Polymerization may be stopped at any desired point by use of conventional "short-stopping" agents such as are disclosed in U.S. Patent 2,576,009. Any unreacted monomer may be removed by known methods, such as by steam stripping as disclosed in U.S. Patent 2,467,769.

The polymer may be isolated by conventional methods, such as by drum drying as disclosed in U.S. Patent 2,914,497, or by coagulating the solid polymer and separating from the aqueous phase. The method of U.S. Patent 2,857,962 may also be used for isolating polymer.

The polymers of this invention may be utilized for the same purposes described in British patent specification No. 905,971 (page 2, lines 36 through 93). Curing may be effected by treatment with amines as disclosed in British 905,971 or, optionally, the polymers may be cured using the conventional compounding agents including zinc oxide and magnesia as disclosed in Murray and Thompson, "The Neoprenes," E. I. du Pont de Nemours & Co., 1963.

Representative examples further illustrating the present invention follow.

Example 1

A series of experiments is carried out using the following procedure: For each experiment, two emulsions are prepared having the following compositions:

| Emulsions | Parts by weights | |
|---|---|---|
| | A | B |
| Chloroprene | 26.7 | 63.3 |
| 2,3-dichloro-1,3-butadiene | 2.7 | 7.3 |
| Diethyl xanthogen disulfide | (¹) | 0 |
| Oleic acid | 2 | 1.8 |
| Water | 42 | 98 |
| Sodium hydroxide | 0.12 | 0.12 |
| Sodium salt of formaldehyde-naphthalene-sulfonic acid condensate | 0.267 | 23 |
| Hydrogen peroxide, 30% aqueous solution | 0.59 | 0 |

¹ Varied as shown in Table I.

Emulsification and subsequent polymerization are carried out in an atmosphere of nitrogen. Polymerization is initiated and maintained by adding, as needed, a solution having the following composition (hereafter, for convenience, designated as "catalyst solution").

Parts by weight
Water _____ 10
Sodium hydroxide _____ 0.004
Aqueous ammonia, 29% _____ 1.5
Sodium hydrosulfite (90% assay) _____ 0.2

The temperature of polymerization is 40° C.

Polymerization of Emulsion A is initiated by addition of a small amount of the catalyst solution. Continuous addition of Emulsion B is then begun at such a rate that when all of the second emulsion has been added the specific gravity is 1.057 (about two hours). When no further increase in specific gravity is observed, about 1.3 parts of a stabilizer emulsion is added containing 1.0% phenothiazine and 1.0% 4-tert-butylpyrocatechol.

The polymer is isolated by drum drying, which is carried out on an 8-inch chromium-plated, double drum drier which is internally heated with steam.

Table I shows the Brookfield viscosities of polymers prepared using, respectively, 10 and 6 parts of diethyl xanthogen disulfide in the A emulsion.

For comparison, polymerizations are carried out in which all of the ingredients are combined in a single emulsion and polymerization is effected using the standard batch procedure. Table I shows the Brookfield viscosities of the polymers prepared by the conventional procedure.

TABLE I

| Amount of xanthogen disulfide, parts | Brookfield viscosity at 25° C.¹ centipoises | |
|---|---|---|
| | Process of this invention | Comparison conventional procedure |
| 10 | 59,000 | 124,000 |
| 6 | 208,000 | 520,000 |

¹ Using a No. 7 spindle rotating at 20 r.p.m.

Example 2

A series of experiments is carried out in which the percentage of modifier in Emulsion A and Emulsion B is varied. The two emulsions have the following composition:

| Emulsion | Parts by weight | |
|---|---|---|
| | A | B |
| Chloroprene | 31.3 | 53.7 |
| 2,3-dichloro-1,3-butadiene | 1.7 | 13.3 |
| Diethyl xanthogen disulfide | (¹) | (¹) |
| Oleic acid | 2 | 1.8 |
| Cumene hydroperoxide (71%) | 0.24 | 0 |
| Water | 106.7 | 33.3 |
| Potassium hydroxide | 0.147 | 0.186 |
| Sodium salt of formaldehyde-naphthalene-sulfonic acid condensate | 0.5 | 0 |

¹ Varied as shown in Table II.

The catalyst solution used to initiate and maintain polymerization has the following composition:

Parts by weight
Water _____ 10
Aqueous ammonia, 29% _____ 1
Sodium hydrosulfite (90% assay) _____ 0.5

Temperature of polymerization is 40° C. Polymerization of Emulsion A is initiated, and when the specific gravity has reached 1.015, addition of Emulsion B is begun and continued at such a rate that the addition is complete by the time the specific gravity of the polymerizing emulsion has reached 1.075 (about 1.5–2.0 hours). Polymerization is continued until no further increase in specific gravity is evident. Stabilization and isolation are carried out as in Example 1.

Table II shows the Brookfield viscosities of the different polymers prepared.

TABLE II

| Diethyl xanthogen disulfide, parts by weight | | Brookfield viscosity of final polymer, centipoises at 26° C. |
|---|---|---|
| Emulsion A | Emulsion B | |
| 8 | 2 | 62,000 |
| 6 | 4 | 74,000 |

Example 3

Two emulsions are prepared having the following composition:

| Emulsion | Parts by weight | |
|---|---|---|
| | A | B |
| Chloroprene | 30 | 69 |
| 2,3-dichloro-1,3-butadiene | 3 | 7 |
| Diethyl xanthogen disulfide | 15 | 0 |
| Oleic acid | 2 | 1.8 |
| Cumene hydroperoxide (71%) | 3 | 0 |
| Water | 106.7 | 33.3 |
| Potassium hydroxide | 0.147 | 0.186 |
| Sodium salt of formaldehyde-naphthalene-sulfonic acid condensate | 0.5 | 0 |

The polymerization is carried out as in Example 2 except that the addition of Emulsion B is begun when the specific gravity of Emulsion A has reached 1.025. The isolated polymer has a Brookfield viscosity at 26° C. of 21,000 centipoises. In contrast when all of the ingredients are emulsified in one batch and polymerized, the final isolated polymer has a Brookfield viscosity of 39,000 centipoises.

Example 4

The procedure of Example 3 is repeated except that Emulsion A contains 33 parts chloroprene and Emulsion B contains 67 parts of chloroprene and no comonomer is present.

The Brookfield viscosity of the isolated polymer is 11,400 cps. at 26° C. before the copolymer has had time to crystallize.

Examples 1, 2, 3 and 4 may be modified by adding from about 0.2 to about 0.6 part sulfur.

As stated heretofore, one significant characteristic of the invention polymer product is that a more fluid polymer is provided. The practical significance of this increased fluidity is that said elastomers which are truly fluid are those readily pourable at room temperature and which can be vulcanized at ordinary temperatures; such elastomers offer significant processing advantages to the trade practicing in this field. Furthermore, the need for expensive compounding and vulcanizing equipment is obviated as said compounding can be carried out with relatively light-duty mixers at the site of application of the elastomer and vulcanization can be accomplished without the usual requirements of elevated temperature and pressure.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. In the process of preparing polymers of chloroprene in aqueous emulsion in the presence of an amount of dialkyl xanthogen disulfide modifier equivalent to 4 to 15 parts by weight of diethyl xanthogen disulfide per 100 parts of monomer, the improvement comprising initiating monomer polymerization in the presence of 25 to 45 percent, by weight, of total monomer to be polymerized and 50 to 100 percent, by weight, of total modifier to be used, followed by adding the remainder of said monomer and said modifier and substantially completing said polymerization.

2. In the process of claim 1, said remainder of monomer and modifier being added continuously.

3. In the process of claim 1, said remainder of monomer and modifier being added incrementally.

References Cited

UNITED STATES PATENTS

| | | |
|---|---|---|
| 2,227,517 | 1/1941 | Starkweather et al. |
| 2,763,635 | 9/1956 | Tucker et al. |
| 2,857,962 | 10/1963 | Smith. |
| 3,107,237 | 10/1963 | Smith. |
| 3,300,433 | 1/1967 | Apotheker _____ 260—29.7 |
| 3,317,451 | 5/1967 | Apotheker _____ 260—29.7 |
| 3,378,538 | 4/1968 | Sparks _____ 260—92.3 |
| 3,392,134 | 7/1968 | Apotheker _____ 260—29.7 |

JOSEPH L. SCHOFER, Primary Examiner

W. F. HAMROCK, Assistant Examiner